(12) United States Patent
Watanabe et al.

(10) Patent No.: US 8,794,261 B2
(45) Date of Patent: Aug. 5, 2014

(54) FLUID CONTROL SYSTEM AND FLUID CONTROL METHOD

(71) Applicant: CKD Corporation, Komaki (JP)

(72) Inventors: Masayuki Watanabe, Kasugai (JP); Yoshiyuki Yamada, Komaki (JP); Shunsuke Umezawa, Kasugai (JP)

(73) Assignee: CKD Corporation, Komaki-shi (JP)

( * ) Notice: Subject to any disclaimer, the term of this patent is extended or adjusted under 35 U.S.C. 154(b) by 0 days.

(21) Appl. No.: 13/758,498

(22) Filed: Feb. 4, 2013

(65) Prior Publication Data
US 2013/0255793 A1 Oct. 3, 2013

(30) Foreign Application Priority Data

Mar. 29, 2012 (JP) ................. 2012-076039
Jan. 10, 2013 (JP) ................. 2013-002386

(51) Int. Cl.
*F16K 31/02* (2006.01)

(52) U.S. Cl.
USPC .... 137/486; 137/487.5; 118/715; 156/345.26

(58) Field of Classification Search
USPC ........... 137/486, 487.5; 118/715; 156/345.15, 156/345.26
See application file for complete search history.

(56) References Cited

U.S. PATENT DOCUMENTS

| | | | | |
|---|---|---|---|---|
| 6,022,483 | A * | 2/2000 | Aral .............................. | 216/59 |
| 6,273,954 | B2 * | 8/2001 | Nishikawa et al. ........... | 118/692 |
| 6,905,549 | B2 * | 6/2005 | Okuda et al. ................. | 118/715 |
| 7,615,120 | B2 * | 11/2009 | Shajii et al. ................... | 118/666 |
| 8,087,427 | B2 * | 1/2012 | Suzuki et al. ................. | 137/486 |
| 8,278,224 | B1 * | 10/2012 | Mui et al. ...................... | 438/778 |
| 2006/0032444 | A1 * | 2/2006 | Hara .............................. | 118/715 |
| 2006/0237063 | A1 * | 10/2006 | Ding et al. .................. | 137/487.5 |
| 2008/0050538 | A1 * | 2/2008 | Hirata ........................... | 427/585 |
| 2009/0053900 | A1 * | 2/2009 | Nozawa et al. ............... | 438/710 |
| 2009/0197424 | A1 * | 8/2009 | Sakai et al. ................... | 438/758 |
| 2010/0212593 | A1 * | 8/2010 | Takebayashi et al. ........ | 118/725 |
| 2011/0065289 | A1 * | 3/2011 | Asai ............................. | 438/791 |
| 2012/0222751 | A1 * | 9/2012 | Okabe ............................ | 137/14 |
| 2012/0251721 | A1 * | 10/2012 | Matsumoto et al. ....... | 427/248.1 |

FOREIGN PATENT DOCUMENTS

JP      B2-4298025      7/2009

* cited by examiner

*Primary Examiner* — John Rivell
*Assistant Examiner* — Minh Le
(74) *Attorney, Agent, or Firm* — Oliff PLC

(57) ABSTRACT

A fluid control system includes a vacuum chamber, a gas supply source to supply gas as a fluid, an exhaust pipe to discharge the fluid from the vacuum chamber, a gas supply pipe to connect the vacuum chamber to the gas supply source, and a pressure sensor to detect an internal pressure of the vacuum chamber. This system further includes a flowmeter placed between the gas supply source and the vacuum chamber, a proportional valve placed between the flowmeter and the vacuum chamber, a pressure controller to control the proportional valve based on output of the pressure sensor, a metering valve placed on the exhaust pipe, and a flow controller to control the metering valve based on an output of the flowmeter.

9 Claims, 13 Drawing Sheets

FLUID CONTROL SYSTEM AND FLUID CONTROL METHOD

CROSS-REFERENCE TO RELATED APPLICATIONS

This application is based upon and claims the benefit of priority from the prior Japanese Patent Applications Nos. 2012-076039 filed Mar. 29, 2012 and 2013-002386 filed Jan. 10, 2013, the entire contents of which are incorporated herein by reference.

BACKGROUND OF THE INVENTION

1. Field of the Invention

The present invention relates to a fluid control system including a vacuum chamber, a gas supply source to supply gas which is a fluid to the vacuum chamber, an exhaust pipe to discharge the fluid from the vacuum chamber, a gas supply pipe connecting the gas supply source to the vacuum chamber, and a pressure sensor to detect the internal pressure of the vacuum chamber.

2. Related Art

As a fluid control system having been conventionally used, there is a vacuum control system 100 shown in FIG. 7, for example. This vacuum control system 100 includes a vacuum chamber 101 for performing a film deposition process on a semiconductor wafer. In the vacuum chamber 101, one wafer or a plurality of wafers are to be disposed. The vacuum chamber 101 is connected to a vacuum pump 104 serving as a vacuum source through an exhaust pipe 102 via a metering valve 103. The vacuum chamber 101 is also connected to a gas supply source 108 through a gas supply pipe 105 via a shut-off valve 106 and a mass flow controller 107 for controlling a flow rate of a fluid. To the exhaust pipe 102, a vacuum pressure sensor 109 and the metering valve 103 are attached. The sensor 109 and the metering valve 103 are connected to a controller 110 for controlling an opening degree of the metering valve 103 based on a pressure value measured by the sensor 109.

Operations of the conventional vacuum control system 100 having the above configuration will be explained below referring to FIG. 8, which is a time chart showing the operations of the vacuum control system 100. In FIG. 8, a horizontal axis of graphs (a) to (d) represents time, a vertical axis of the graph (a) represents a pressure and a solid line P2 indicates the internal pressure of the vacuum chamber 101, a vertical axis of the graph (b) represents a flow rate and a solid line M2 indicates the flow rate of a process gas passing through the mass flow controller 107, a vertical axis of the graph (c) represents an opening degree and a solid line H2 indicates the opening degree of the shut-off valve 106, and a vertical axis of the graph (d) represents an opening degree and a solid line V2 indicates the opening degree of the metering valve 103.

The vacuum control system 100 is arranged to provide a stage TA2 in which the internal pressure of the vacuum chamber 101 is at a vacuum state value R and a stage TC2 in which the internal pressure of the vacuum chamber 101 is at a pressure set value Q. Furthermore, the system 100 further provides a stage TB2 to adjust the internal pressure to the pressure set value Q and a stage TD2 to adjust the internal pressure to the vacuum state value R. In other words, the vacuum control system 100 is configured to repeat a cycle from the stage TA2 via the stage TB2 and the stage TC2 to the stage TD2, and back to the stage TA2, to deposit a film on each wafer.

In the stage TA2, the shut-off valve 106 is closed and the metering valve 103 is opened. Thus, the vacuum pressure in the vacuum chamber 101 is brought into a vacuum state value R (a fully evacuated state) by the vacuum pump 104.

In the stage TB2, in order to control or adjust the internal pressure of the vacuum chamber 101 from the vacuum state value R to the pressure set value Q, the metering valve 103 is turned to a closed state in a short time as shown by the solid line V2 while the shut-off valve 106 is turned to an open state indicated by the solid line H2. When the shut-off valve 106 is opened, the process gas at a flow rate controlled by the mass flow controller 107 as indicated by the solid line M2 is allowed to flow at a constant rate. When a constant rate of the process gas flows in the vacuum chamber 101, the pressure inside the vacuum chamber 101 rises as indicated by the solid line P2.

In the stage TC2, the vacuum pressure sensor 109 measures that the internal pressure of the vacuum chamber 101 reaches the pressure set value Q.

At the same time when the internal pressure reaches the pressure set value Q, the metering valve 103 is opened as indicated by the solid line V2. Accordingly, the internal pressure of the vacuum chamber 101 is made stable at the pressure set value Q as shown by the solid line P2.

RELATED ART DOCUMENTS

Patent Documents

Patent Document 1: Japanese Patent No. 4298025

SUMMARY OF INVENTION

Problems to be Solved by the Invention

However, the related arts have the following disadvantages or problems. Specifically, the vacuum control system 100 employs the mass flow controller 107. However, a mass flow controller inherently excels in allowing a fluid to flow at a designated constant flow rate with high accuracy, but is unable to change the flow rate in a short time. In the stage TB2, therefore, the mass flow controller has to control the flow rate of the process gas to be constant at a flow-rate set value W which is a necessary value in the stage TC2. Accordingly, it takes as long as about 15 seconds or more to adjust the pressure of the vacuum chamber 101. This causes a problem that a semiconductor manufacturing time becomes long, resulting in a high production cost.

In particular, in an ALD (Atomic Layer Deposition) process in which film deposition (process gas supply) on wafers and gas exhaust are repeated 350 to 500 times, if the pressure control time is long, the manufacturing time of the wafers is also long, resulting in a high production cost.

Further, the mass flow controller 107 of the vacuum control system 100 is expensive and needs very frequent maintenance for accuracy correction and breakdown. This causes a problem with an increase in manufacturing cost.

The applicants therefore conceived a fluid control system 200 shown as a referential example in FIG. 3 without using the mass flow controller to shorten the pressure control time.

As shown in FIG. 3, a vacuum chamber 201 is connected to a vacuum pump 214 serving as a vacuum source through an exhaust pipe 212 via a metering valve 213. The vacuum chamber 201 is also connected to a gas supply pipe 215. This pipe 215 is connected to a process gas supply source 218 via a proportional valve 216.

The proportional valve 216 and the metering valve 213 are connected to a controller 222 to control the opening degrees of the valves 216 and 213 based on the pressure measured by a pressure sensor 219.

In the case of using the fluid control system 200 of the referential example, using no mass flow controller, manufacturing facilities are low in cost. Furthermore, this system 200 using the proportional valve 216 instead of a mass flow controller can change a supply rate of process gas in a short time and hence shorten the pressure control time.

However, the fluid control system 200 is unable to control a flow rate of process gas because of no use of a flowmeter. This system 200 therefore has a problem that could not control the flow rate of process gas which is one of important treatment conditions in a semiconductor manufacturing process.

The present invention has been made to solve the above problems and has a purpose to provide a fluid control system capable of shortening pressure control time of internal pressure of a vacuum chamber and reducing a manufacturing cost, and controlling a flow rate of process gas.

Means of Solving the Problems

To achieve the above purpose, one aspect of the invention provides a fluid control system comprising: a gas supply source to supply gas which is a fluid to the vacuum chamber; an exhaust pipe to discharge the fluid from the vacuum chamber; a gas supply pipe to connect the vacuum chamber and the gas supply source; a pressure sensor to detect an internal pressure of the vacuum chamber; a flowmeter placed on the gas supply pipe between the gas supply source and the vacuum chamber; a proportional valve placed on the gas supply pipe between the flowmeter and the vacuum chamber; a pressure controller to control the proportional valve in response to an output of the pressure sensor; a metering valve placed on the exhaust pipe; and a flow controller to control the metering valve in response to an output of the flowmeter.

Accordingly, the time needed to control or adjust the internal pressure of the vacuum chamber can be shortened. This is because a gas flow rate is regulated by the proportional valve without use of a mass flow controller at the time of pressure control, so that a large amount of process gas can be supplied into the vacuum chamber in a short time. Thus, the internal pressure of the vacuum chamber rises quickly and the pressure control time can be shortened. Because of the shortened pressure control time, an operating time needed to perform film deposition of a wafer(s) can be shortened, resulting in a reduced manufacturing time for a semiconductor and a reduced manufacturing cost.

Since the fluid control system is configured to control the pressure and the gas supply rate without using a mass flow controller, the fluid control system can be provided at low cost.

To achieve the above purpose, furthermore, another aspect of the invention provides a fluid control method of controlling a fluid control system comprising: a gas supply source to supply gas which is a fluid to the vacuum chamber; an exhaust pipe to discharge the fluid from the vacuum chamber; a gas supply pipe to connect the vacuum chamber and the gas supply source; a pressure sensor to detect an internal pressure of the vacuum chamber; a flowmeter placed between the gas supply source and the vacuum chamber; a proportional valve placed between the flowmeter and the vacuum chamber; a pressure controller to control the proportional valve in response to an output of the pressure sensor; a metering valve placed on the exhaust pipe; and a flow controller to control the metering valve in response to an output of the flowmeter, wherein the metering valve is controlled to regulate a flow rate of the gas to a flow-rate set value.

Accordingly, the time needed to control or adjust the internal pressure of the vacuum chamber can be shortened. This is because a gas flow rate is regulated by the proportional valve without use of a mass flow controller at the time of pressure control, so that a large amount of process gas can be supplied into the vacuum chamber in a short time. Thus, the internal pressure of the vacuum chamber rises quickly and the pressure control time can be shortened. Because of the shortened pressure control time, an operating time needed to perform film deposition of a wafer(s) can be shortened, resulting in a reduced manufacturing time for a semiconductor and a reduced manufacturing cost.

Effects of the Invention

According to the invention, it is possible to provide a fluid control system capable of shortening pressure control time and controlling a flow rate of process gas without using a mass flow controller that is expensive and has a high maintenance frequency.

DESCRIPTION OF EMBODIMENTS

A detailed description of a vacuum control system as preferred embodiments of a fluid control system according to the present invention will now be given referring to the accompanying drawings.

(First Embodiment)
<Entire Configuration of Vacuum Control System>

Figure 1:
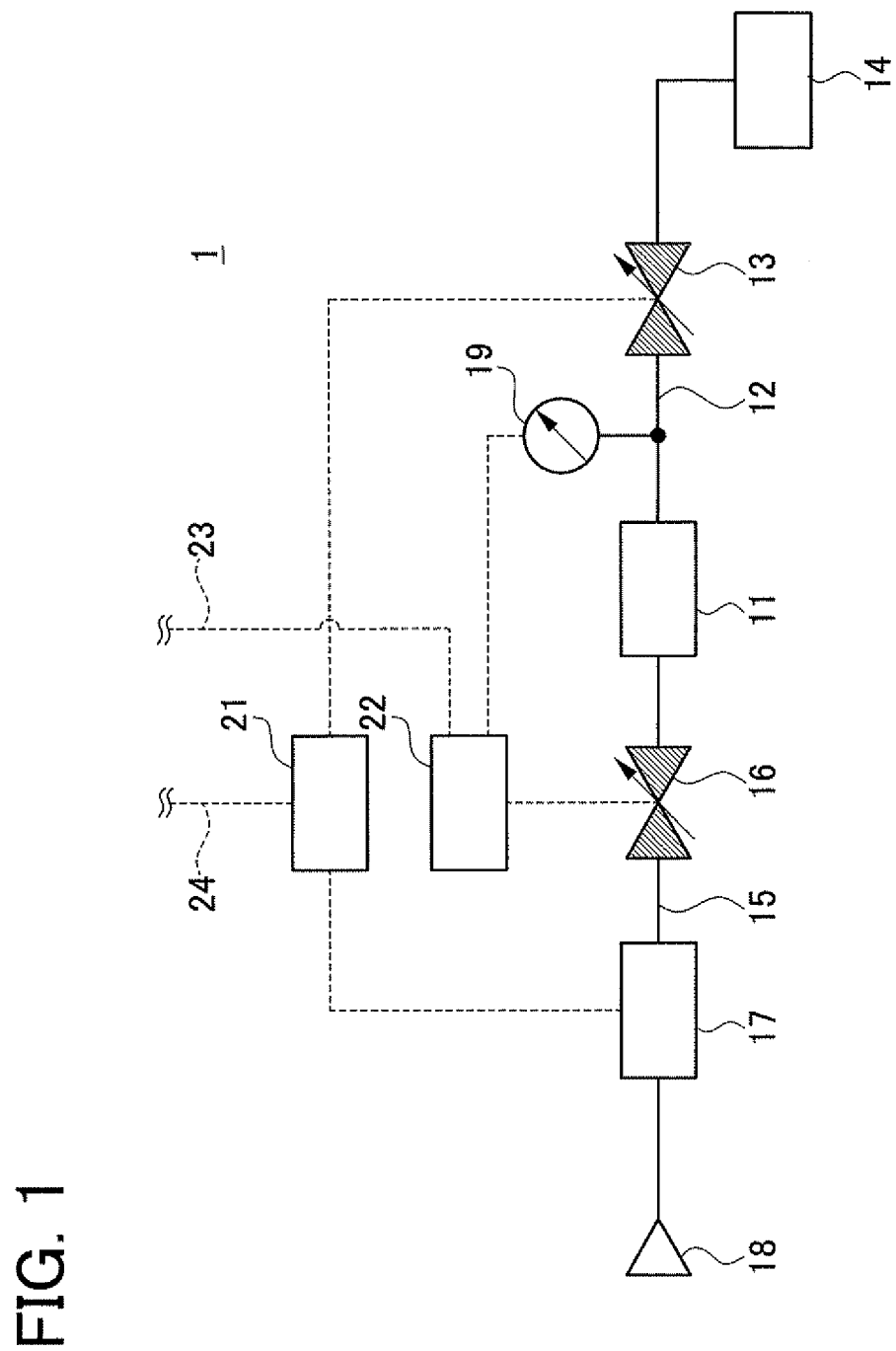
FIG. 1 is a diagram showing an entire configuration of a fluid control system of a first embodiment of the invention.

FIG. 1 shows an entire configuration of a vacuum control system 1 of the first embodiment. This system 1 is suitable for an ALD (Atomic Layer Deposition) process. Herein, the ALD process is a film deposition method including repeating the steps of firstly supplying a process gas onto a wafer or wafers placed in a vacuum chamber to deposit a film on the surface of the wafer(s) by adsorption and reaction of molecules of a material compound, secondly discharging the process gas to remove redundant molecules, supplying a process gas for film deposition again on the surface of the wafer(s) by adsorption and reaction of molecules of a material compound, and then discharging the process gas. By this method, atomic layers are one-by-one formed one on top of another.

As shown in FIG. 1, a vacuum chamber 11 is connected to a gas supply pipe 15 communicating to a process gas supply source 18 for supplying a process gas to the vacuum chamber 11. On the gas supply pipe 15, there are arranged a proportion valve 16 and a flowmeter 17 are arranged. For supply of one process gas or a plurality of process gases, the process gas supply source 18, the flowmeter 17, the proportional valve 16, and the gas supply pipe 15 may be arranged in one set or plural sets. In the vacuum chamber 11, one wafer or a plurality of wafers are placed, and subjected to a film deposition process. The gas supply pipe 15 is connected to the process gas supply source 18 via the proportional valve 16. The gas supply pipe 15 is also connected to the flowmeter 17 to measure a supply flow rate of process gas flowing through the pipe 15. The process gas supply source 18 is one example of a gas supply source of the invention.

The vacuum chamber 11 is connected to an exhaust pipe 12 for gas exhaust, which communicates to a vacuum pump 14. Specifically, the exhaust pipe 12 is connected to the vacuum pump 14 via a metering valve 13. Furthermore, the exhaust pipe 12 is connected to a pressure sensor 19 to measure the internal pressure of the vacuum chamber 11.

The metering valve 13 is connected to a flow controller 21 arranged to control the metering valve 13 with a command value based on a measured value (an output value) of the flowmeter 17. The flow controller 21 stores in a memory not shown a flow-rate set value W shown in FIG. 2(b) or 4(b). The flow controller 21 controls the opening degree of the metering valve 13 based on the flow-rate set value W. This flow-rate set value W is previously set.

The proportional valve 16 is connected to a pressure controller 22 to control the proportional valve 16 with a command value based on a measured value (an output value) of the pressure sensor 19. The pressure controller 22 stores in a memory not shown a pressure set value Q and a constant value Y shown in FIG. 2(a) or 4(a). The pressure controller 22 controls the opening degree of the proportional valve 16 based on the pressure set value Q and the constant value Y.

The flow controller 21 and the pressure controller 22 are connected respectively to command lines 24 and 23 to receive a change command of the flow-rate set value and a timing command up to flow-rate control after pressure control. The pressure set value Q and the constant value Y are previously set.

A characteristic configuration of the vacuum control system I is in that a flow rate of process gas allowed to flow in the vacuum chamber 11 is controlled by the metering valve 13. This is because it is conventionally general to control a flow rate of process gas by using a mass flow controller on the gas supply pipe 15 near the process gas supply source 18.

In the vacuum control system 1, a flow rate of process gas can be controlled by the metering valve 13 located on an exit side (a downstream side) of the vacuum chamber 11 because the internal pressure of the vacuum chamber 11 is controlled in advance by the proportional valve 16. Accordingly, even after the process gas passes through the vacuum chamber 11, the flow rate of process gas can be controlled by the metering valve 13 on the exit side of the chamber 11. The reason why the flow rate of process gas is not controlled conventionally by a metering valve on the exit side of a vacuum chamber is because it was inconceivable that the flow rate of process gas could be controlled on the exit side. In contrast, the inventors found that a flow rate of process gas could be controlled by the metering valve 13 on the exit side as long as the internal pressure of the vacuum chamber 11 is controlled by the process gas flowing in the vacuum chamber 11. Therefore, the vacuum control system 1 of the present embodiment could not be anticipated by the conventional concept.

<Operations and Advantages of Vacuum Control System>

Figure 4:
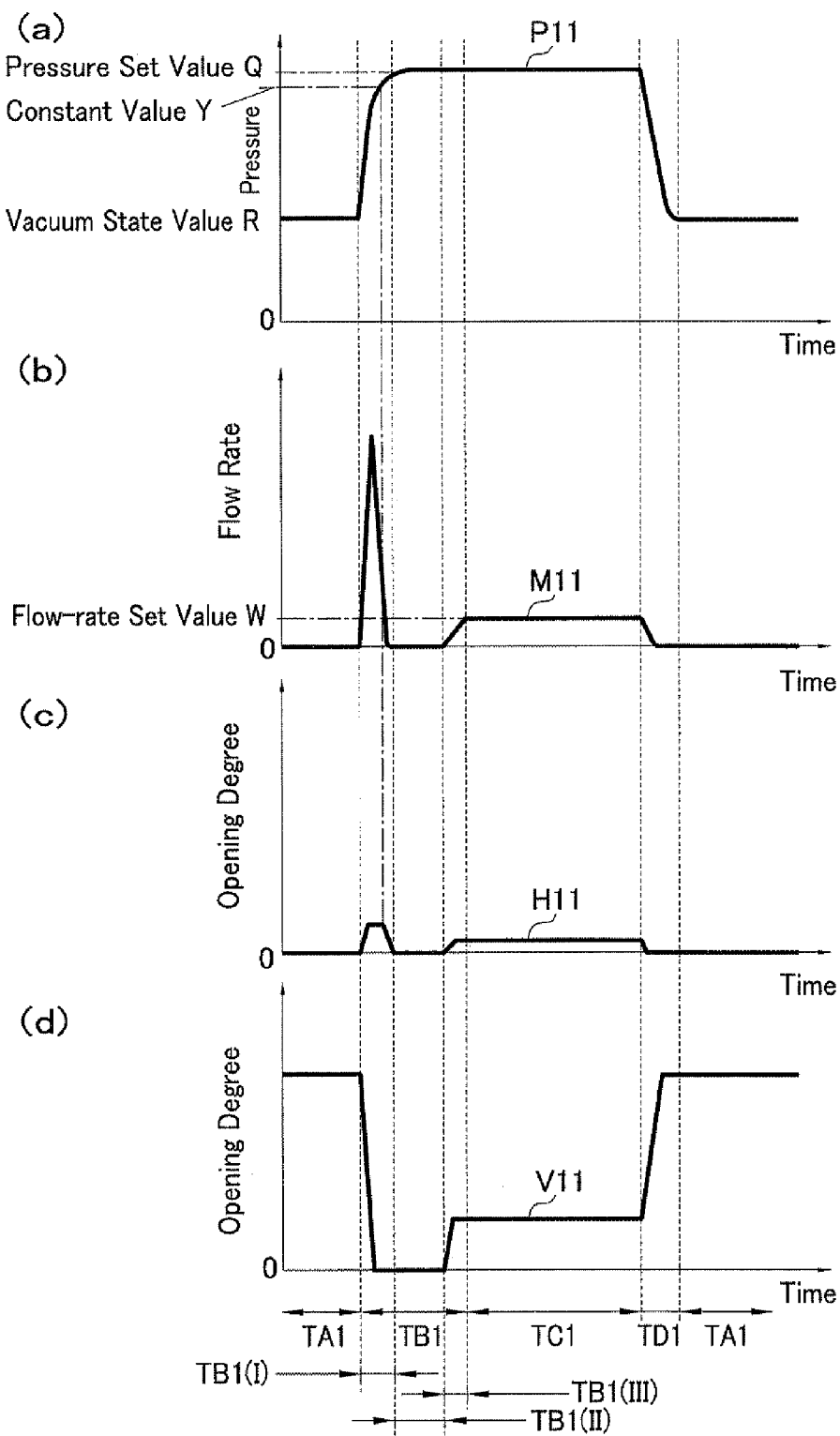
FIG. 4 is a time chart characteristically showing the operations for pressure control and flow-rate control of the fluid control system of the first embodiment.

Operations of the vacuum control system 1 having the above configuration will be explained referring to FIG. 4. In FIG. 4, a horizontal axis of graphs (a) to (d) represents time, a vertical axis of the graph (a) represents a pressure and a solid line P11 indicates the internal pressure of the vacuum chamber 11, a vertical axis of the graph (b) represents a flow rate and a solid line M11 indicates the flow rate of process gas passing through the flowmeter 17, a vertical axis of the graph (c) represents an opening degree and a solid line H11 indicates the opening degree of the proportional valve 16, and a vertical axis of the graph (d) represents an opening degree and a solid line V11 indicates the opening degree of the metering valve 13.

The vacuum control system 1 is arranged to provide a stage TA1 in which the internal pressure of the vacuum chamber 11 is at a vacuum state value R and a stage TC1 in which the internal pressure of the vacuum chamber 11 is at a pressure set value Q. The system 1 further provides a stage TB1 to adjust the internal pressure to the pressure set value Q and a stage TD1 to adjust the internal pressure to the vacuum state value R. In other words, the vacuum control system 1 is adapted to repeat a cycle from the stage TA1 via the stage TB1 and the stage TC1 to the stage TD1, and back to the stage TA1, to deposit a film on each wafer.

Stage TA1

In the stage TA1, the proportional valve 16 is closed and the metering valve 13 is opened. Thus, the vacuum chamber 11 is placed in a fully evacuated state. The internal pressure of the vacuum chamber 11 is at a vacuum state value R which is a value representing a fully evacuated state as indicated by the solid line P11 in FIG. 4(a).

Stage TB1

The stage TB1 is divided into three stages; stage TB1(I), stage TB1(II), and stage TB1(III). In the stage TB1(I), the metering valve 13 is closed to stop gas exhaust, and pressure setting to achieve the pressure set value Q is performed by the pressure controller 22. Accordingly, until the solid line P11 reaches the constant value Y, the proportional valve 16 is operated in a valve opening direction. Thus, the process gas is introduced in the vacuum chamber 11 and the internal pressure of the vacuum chamber 11 is started to be controlled. Even when the vacuum chamber 11 has a large volume, the proportional valve 16 being able to be widely opened in a short time, the internal pressure of the chamber 11 can be brought close to the pressure set value Q in a short time.

When the pressure sensor 19 detects that the solid line P11 reaches the constant value Y, the proportional valve 16 is operated in a valve closing direction to reduce the flow rate of process gas. In addition, when the solid line P11 reaches the pressure set value Q, the proportional valve 16 is completely closed.

Herein, the constant value Y is a predicted value for the pressure set value Q to prevent a delay in control timing due to the transmission time of a control command and the operation time of the valve.

In the stage TB1(II), if the flow-rate set value W set in the flow controller 21 is zero, the proportional valve 16 and the metering valve 13 are held closed, maintaining the pressure set value Q.

In the stage TB1(III), flow-rate setting to achieve the flow-rate set value W is performed by the flow-rate controller 21. Accordingly, as indicated by the solid line V11 in FIG. 4(d), the proportional valve 13 is operated in a valve opening direction, thereby starting exhaust or evacuation of the vacuum chamber 11. The internal pressure of the vacuum chamber 11 at that time is in a state set at the pressure set value Q. When the pressure sensor 19 detects a pressure drop, the proportional valve 16 is operated as indicated by the solid line H11 in FIG. 4(c) to introduce process gas into the vacuum chamber 11 until the pressure set value Q is obtained. The proportional valve 16 is operated in response to a command from the pressure controller 22 to adjust the internal pressure of the vacuum chamber 11 to the pressure set value Q. The metering valve 13 is operated in response to a command from the flow controller 21 to regulate the flow rate of process gas to the flow-rate set value W.

Stage TC1

In the stage TC1, the pressure set value Q and the flow-rate set value W are constant, and the metering valve 13 and the proportional valve 16 are held at respective opening degrees to maintain the flow rate and the pressure.

Stage TD1

In the stage TD1, to change the state where the pressure set value Q and the flow-rate set value W are maintained to a fully evacuated state, the proportional valve 16 is closed and the metering valve 13 is further opened. Thus, the system 1 returns to the stage TA1 in which the internal pressure of the vacuum chamber 11 is in the fully evacuated state.

Explanation of Operations of Another Example of Pressure Control

In the stage TB1(I), when stepwise pressure setting is performed up to the pressure set value Q by the pressure controller 22, the proportional valve 16 makes stepwise valve opening and closing operations with respect to stepwise pressure set values. This enables the internal pressure of the vacuum chamber 11 to be changed in stepwise fashion. Further, the stepwise pressure set values may be set and stored in advance.

Accordingly, it is possible to freely control the introduction amount of process gas to the vacuum chamber 11. This can prevent particles from being raised in the vacuum chamber 11 and shorten the pressure control time.

Explanation of Operations for Shortening Vacuum Control Time

Figure 2:
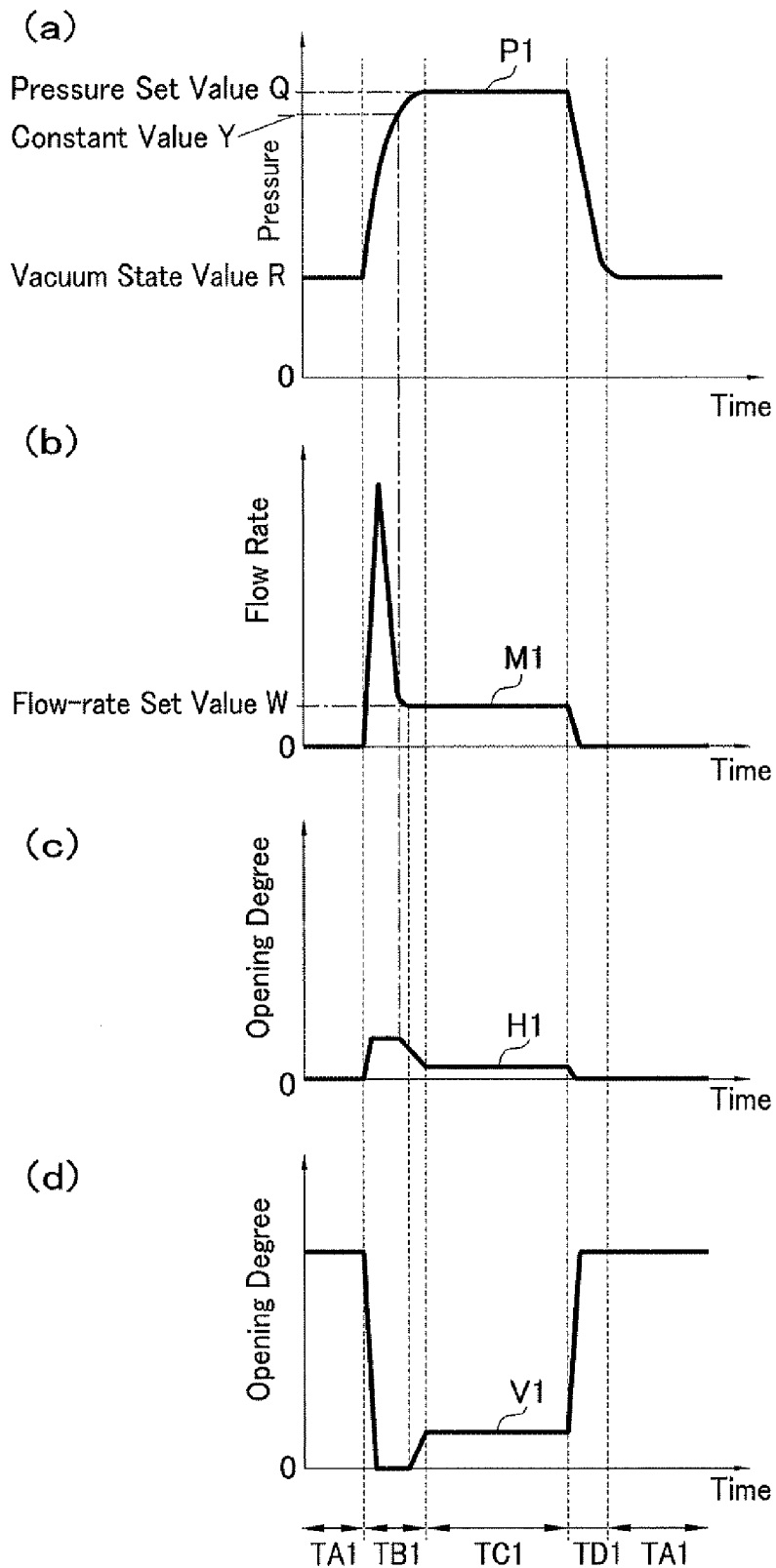
FIG. 2 is a time chart showing operations for pressure control and flow-rate control of the fluid control system of the first embodiment.
Figure 3:
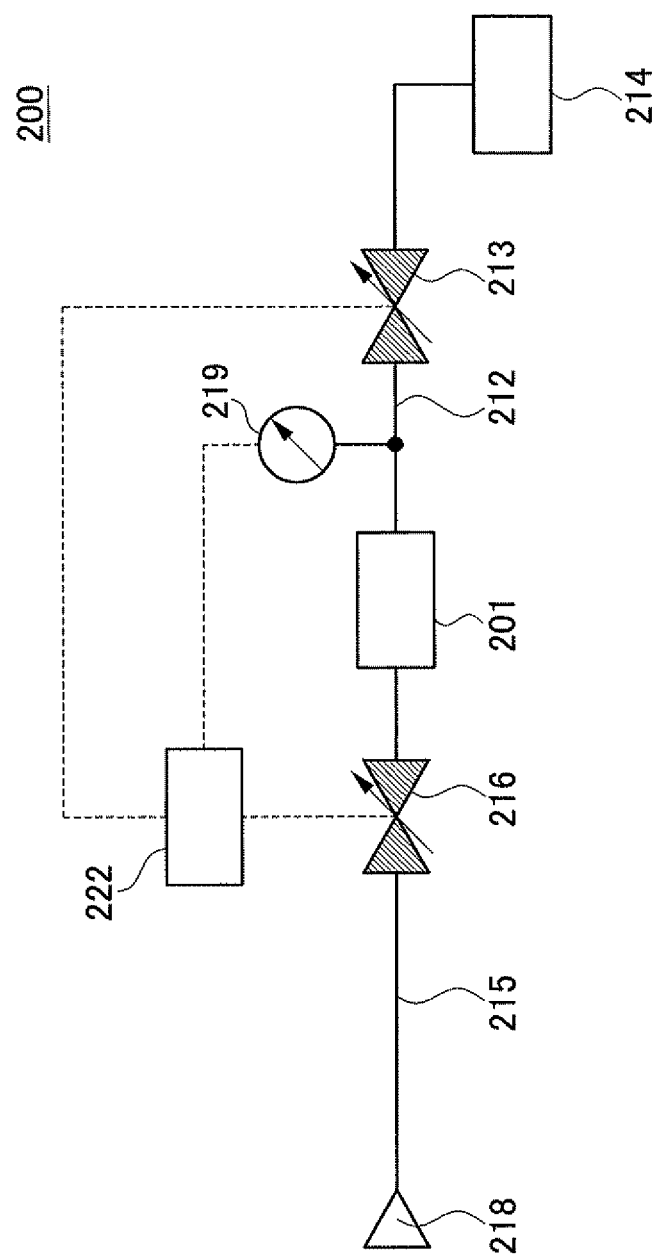
FIG. 3 is a diagram showing an entire configuration of a fluid control system of a referential example.

FIG. 2 shows a case where the stage TB1(II) is omitted and pressure control in the stage TB1(I) and flow-rate control in the stage TB1(III) are performed continuously. Herein, the solid line P1 indicates the internal pressure of the vacuum chamber 11, the solid line M1 denotes the flow rate of process gas passing through the flowmeter 17, the solid line H1 represents the opening degree of the proportional valve 16, and the solid line V1 indicates the opening degree of the metering valve 13. By sequentially performing the pressure control and the flow-rate control, the proportional valve 16 does not have to be closed and then opened again, as indicated by the solid line H1 in FIG. 2(c), so that the vacuum control time (TB1) is reduced.

Consequently, the process gas flow rate is regulated by changing the opening degree of the metering valve 13. The internal pressure of the vacuum chamber 11 is adjusted by changing the opening degree of the proportional valve 16. Specifically, the metering valve 13 regulates the process gas flow rate and the proportional valve 16 adjusts the pressure. As a result of the control of the pressure and the flow rate which are different targets of the valves 13 and 16, the internal pressure of the vacuum chamber 11 can be adjusted to the pressure set value Q and the process gas flow rate can be regulated to the flow-rate set value W.

In the present embodiment, as mentioned above, the pressure control operation to adjust the internal pressure of the vacuum chamber 11 in FIG. 2 to the pressure set value Q and the flow-rate control operation to regulate the process gas flow rate to the flow-rate set value W are performed continuously. Thus, the time needed for the stage TB1 can be shortened.

In the present embodiment, the flow rate of process gas can be increased in a short time by use of the proportional valve 16. This enables the internal pressure of the vacuum chamber 11 to be increased in a short time to quickly reach the pressure set value Q. To be concrete, in the present embodiment, the time needed to change the internal pressure from the vacuum state value R to the pressure set value Q in the stage TB1 is about 5 seconds. Thus, the operating time for film deposition of a wafer(s) can be reduced and hence a semiconductor can be manufactured in a short time.

Comparison with Related Art

Figure 7:
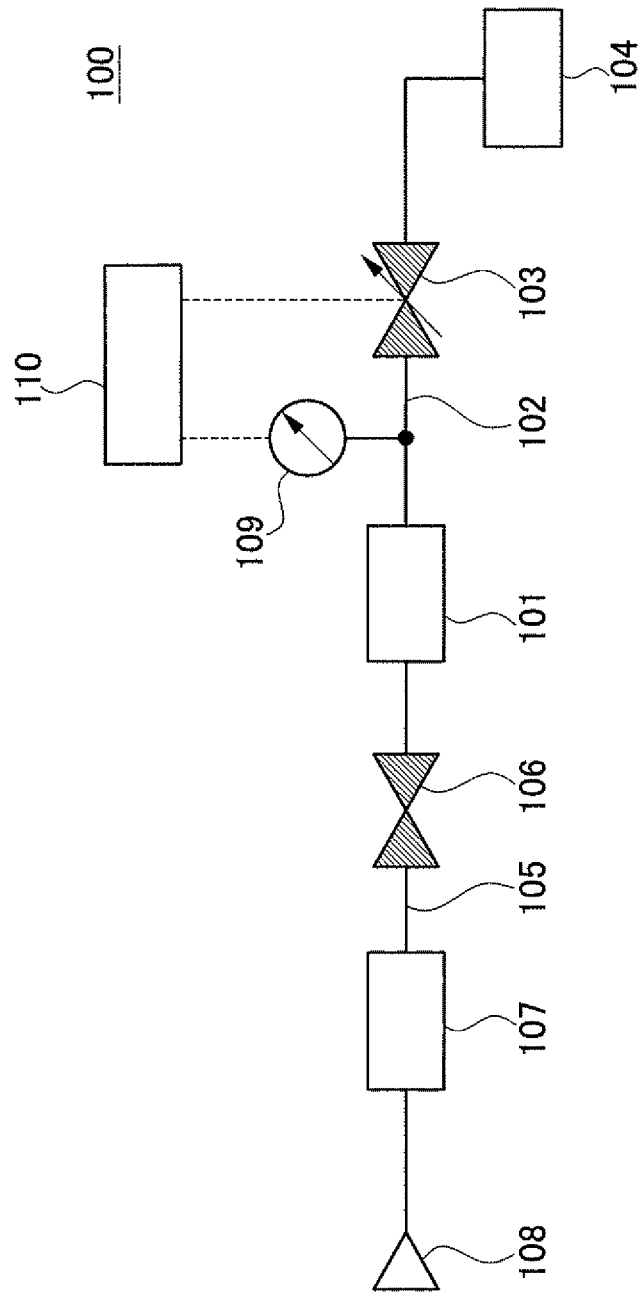
FIG. 7 is a diagram showing an entire configuration of a fluid control system in a related art.
Figure 8:
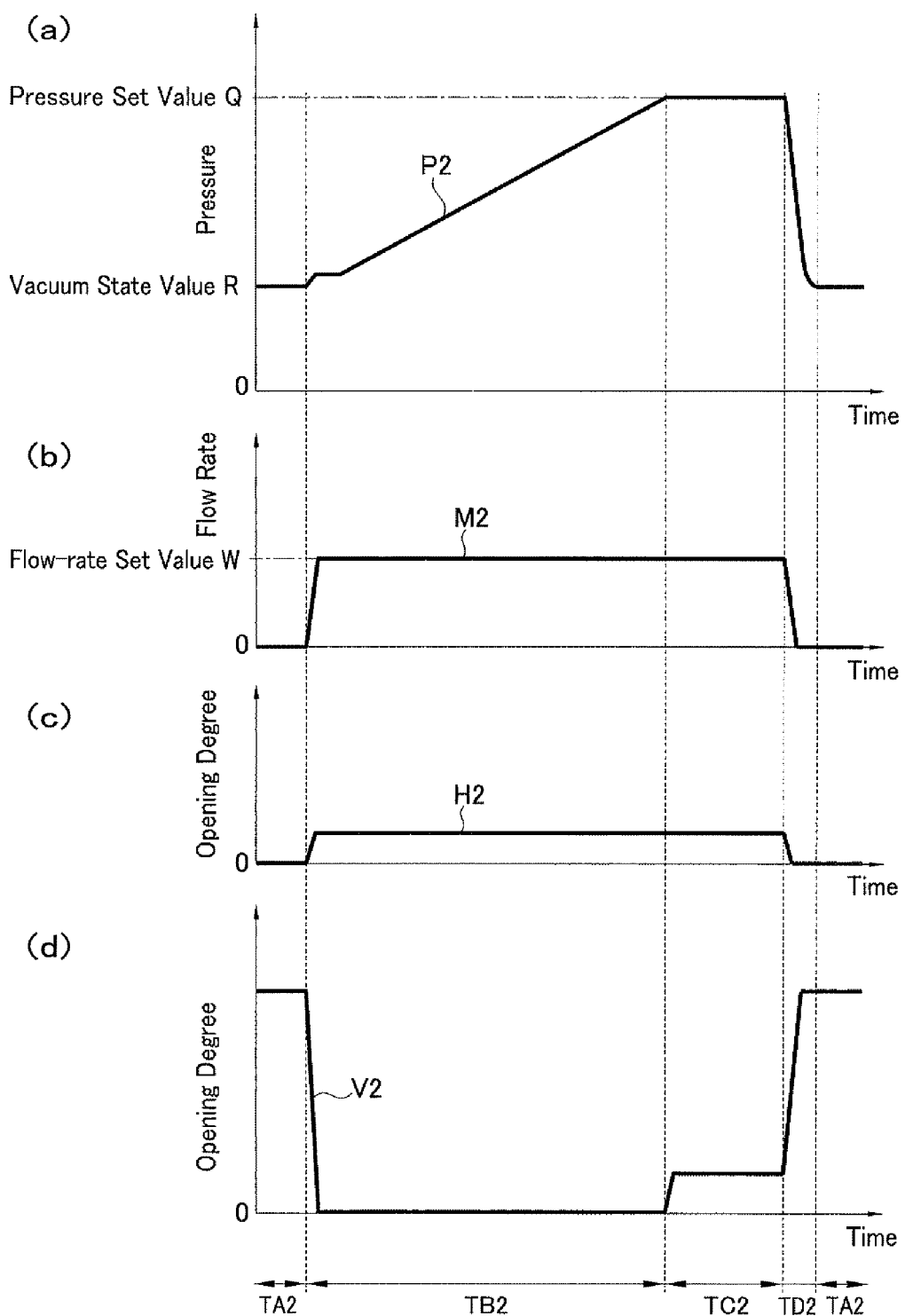
FIG. 8 is a time chart showing operations for pressure control and flow-rate control of the fluid control system in the related art.

In the conventional vacuum control system 100, it takes about 15 seconds or more in the stage TB2 to change the internal pressure of the vacuum chamber 101 shown in FIG. 8(a) from the vacuum state value R to the pressure set value Q. This is because the process gas flow rate is controlled by the mass flow controller 107 shown in FIG. 7 and thus the process gas flow rate could not be increased in a short time as shown in FIG. 2 of the present embodiment. Therefore, it is necessary to take about 15 seconds or more to bring the internal pressure of the vacuum chamber 101 to the pressure set value Q.

It is conceivable to change a flow-rate set value of the mass flow controller to shorten the pressure control time of the vacuum chamber 101. In such a case, however, the internal pressure of the vacuum chamber 101 fluctuates when the flow-rate set value is changed, taking long until the internal pressure of the vacuum chamber 101 becomes stable at a set pressure.

In the related art, moreover, the use of the mass flow controller 107 results in expensive manufacturing facilities. The mass flow controller requires very frequent maintenance due to frequent occurrence of troubles. This deteriorates a production efficiency of a semiconductor.

In the present embodiment, for example, it takes about 5 seconds in the stage TB1 to change the internal pressure of the vacuum chamber 11 indicated by the solid line P1 in FIG. 2(a) from the vacuum state value R to the pressure set value Q. Accordingly, the internal pressure of the vacuum chamber 11 can be adjusted to the pressure set value Q within about a third of the time as compared with the related art. Thus, film deposition of a wafer(s) can be finished in a short time and a semiconductor can be manufactured in a shorter time than in the related art.

In the ALD process in which the stages TA1, TB2, TC1, and TD1 are repeated in sequence, especially, the time reduction is a large effect.

In the present embodiment, the flow rate of process gas is controlled by the inexpensive flowmeter (a mass flowmeter) instead of the mass flow controller which is expensive and needs very frequent maintenance. Thus, low-cost manufacturing facilities are realized. Since the flowmeter (the mass flowmeter) has a simple configuration, it is less likely to cause troubles. Thus, at least production efficiency can be enhanced.

Figure 13:
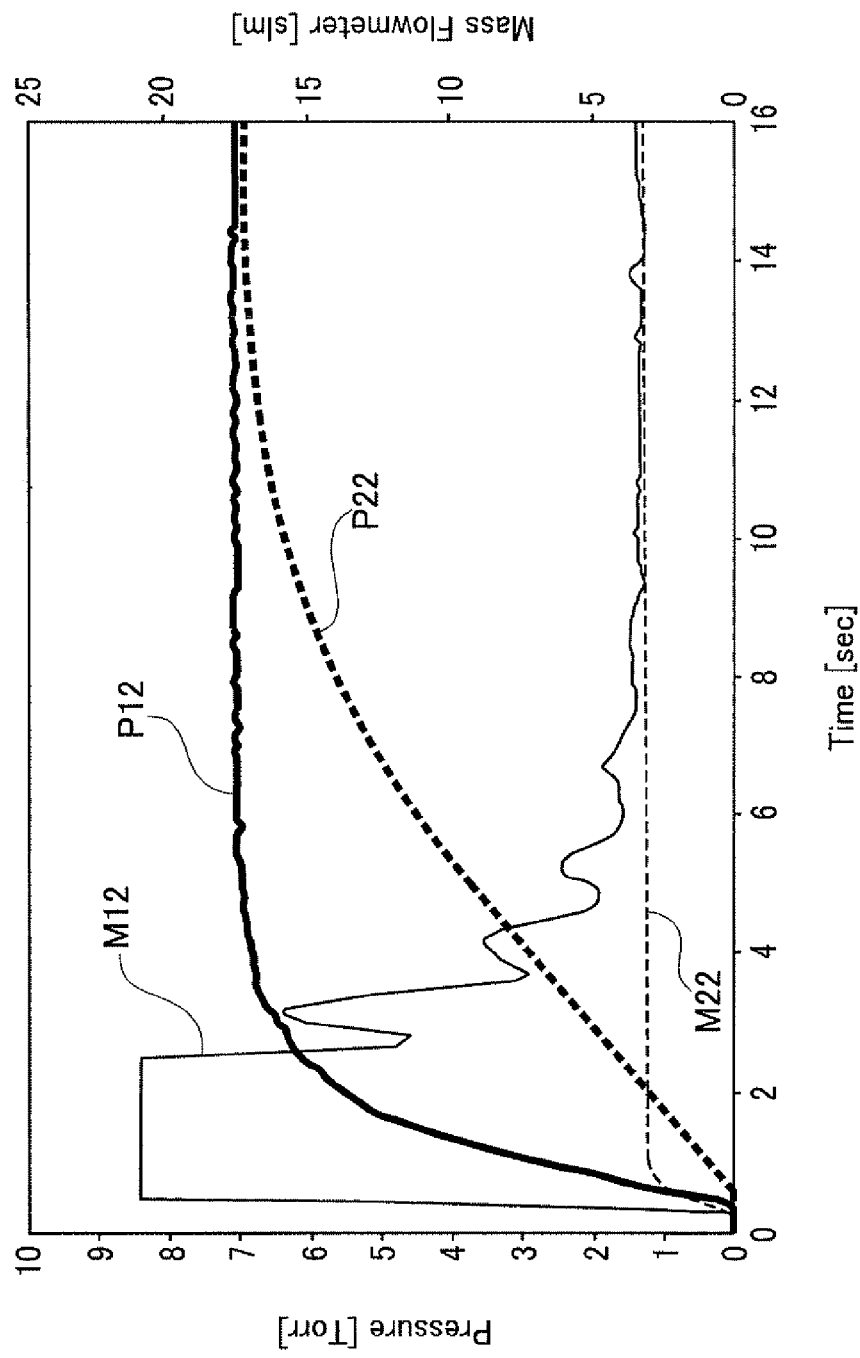
FIG. 13 is a diagram showing experimental results of pressure and flow rate of the vacuum chamber of the fluid control system of the first embodiment of the invention and pressure and flow rate of the vacuum chamber of the conventional fluid control system.

FIG. 13 is a graph showing experimental results to shift from the vacuum state value R (0 Torr (0 kPa)) to the pressure set value Q (7 Torr (0.9331 kPa)), the result being indicated by a pressure waveform P12 of the internal pressure of the vacuum chamber using the vacuum control system 1 and a flow rate waveform M12 measured by the flowmeter, and a pressure waveform P22 of the internal pressure of the vacuum chamber using the conventional fluid control system and a flow rate waveform M22 measured by the flowmeter (the mass flowmeter). The present experimental conditions are set so that the internal pressure of the vacuum chamber 11 is 7 Torr (0.9331 kPa)/3 slm, initial values of the flow rate values M12 and M22 and the pressure values P12 and P22 are all zero, and the time is also 0 second.

In the vacuum control system I of the present embodiment in which the proportional valve 16 is greatly opened, the flow rate waveform M12 exceeds 20 slm after a lapse of about 0.5 second. In association therewith, the pressure waveform P12 of the vacuum chamber 11 also becomes 7 Torr (0.9331 kPa) after a lapse of about 5 seconds.

On the other hand, in the conventional vacuum control system in which the shut-off valve is not greatly opened, the flow rate waveform M22 remains at about 3.5 slm. In association therewith, it takes about 15 seconds or more until the pressure waveform P22 of the vacuum chamber reaches 7 Torr (0.9331 kPa).

Therefore, the use of the vacuum control system 1 of the present embodiment enables the internal pressure of the vacuum chamber 11 to be adjusted to the set pressure more than three times faster than in the related art. In the ALD process particularly where film deposition of wafers (supply of process gas) and gas exhaust are repeated 350 to 500 times, the pressure control time can be shortened, resulting in a reduced manufacturing time of a semiconductor. This system is effective in reducing a production cost.

(Second Embodiment)

Figure 9:
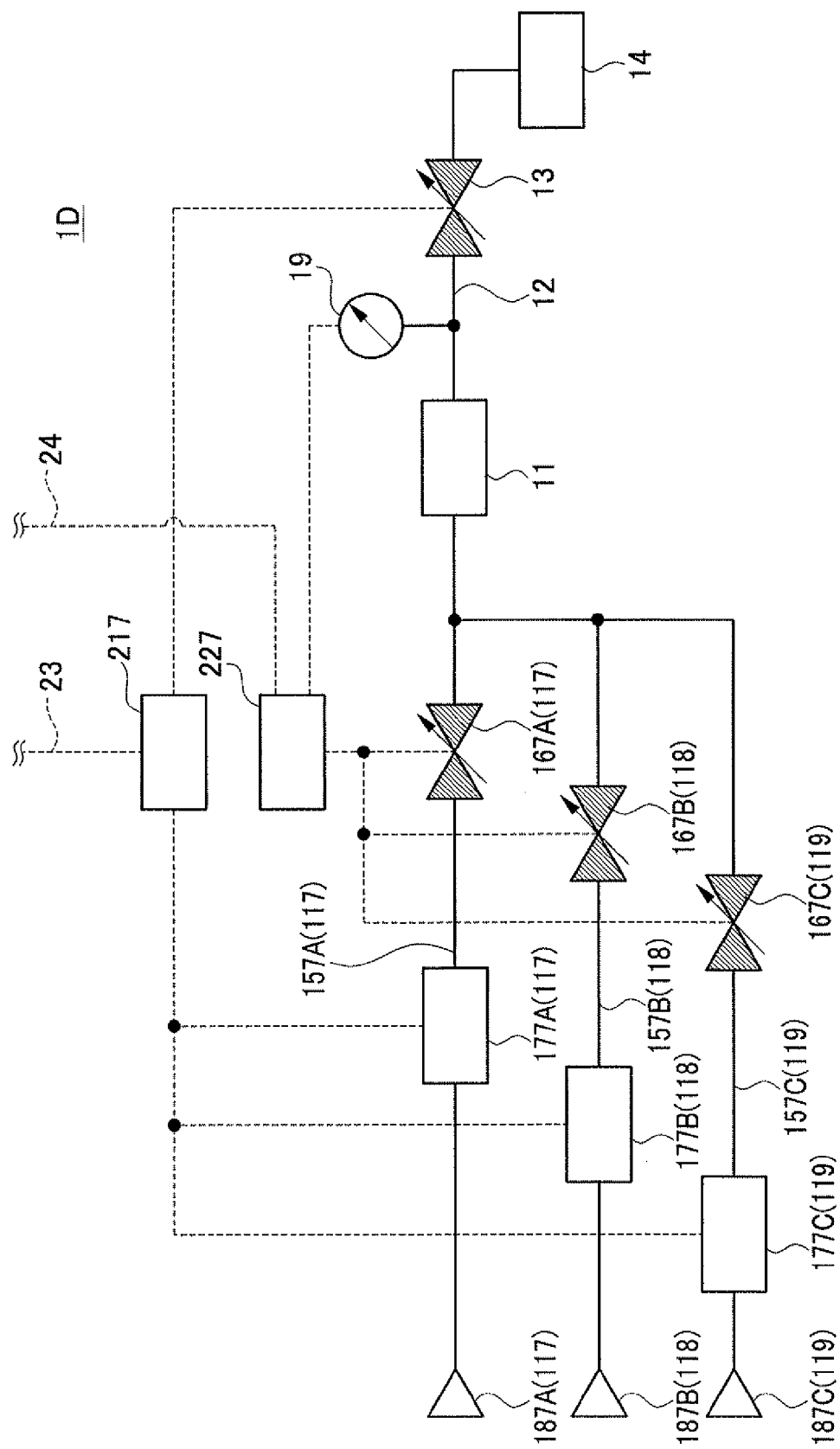
FIG. 9 is a diagram showing an entire configuration of a fluid control system of a second embodiment of the invention.

FIG. 9 shows an entire configuration of a vacuum control system 1D of a second embodiment of the invention. In FIG. 9, there is provided a set of gas supply unit 117 including to a gas supply source 187A, and a flowmeter 177A and a proportional valve 167A both communicating with the gas supply source 187A and being arranged on a gas supply pipe 157A.

As with the gas supply unit 117, a plurality of sets of gas supply units 118 and 119 are provided, respectively including gas supply sources 187B and 187C, flowmeters 177B and 177C and 167B and 167C arranged on gas supply pipes 157B and 157C. The gas supply units 117, 118, and 119 are arranged in parallel and individually communicated to the vacuum chamber 11. Furthermore, the flowmeters 177A, 177B, and 177C are each connected to a flow controller 217 through command lines.

In FIG. 9, the same reference signs as those in FIG. 1 denote similar or identical parts to those in the first embodiment. The details thereof are thus omitted herein.

The vacuum control system 1D including a plurality of the gas supply sources 187A, 187B, and 187C is configured to supply more than one gas to the vacuum chamber 11. The gas supply units 117, 118, and 119 are identical in configuration to those in the vacuum control system 1 of the first embodiment. The vacuum control system 1D including the gas supply units 117, 118, and 119 can shorten the time for controlling the internal pressure of the vacuum chamber 11, resulting in a reduced manufacturing cost of a semiconductor, and control a flow rate of each of the plurality of gasses. In the ALD process particularly where film deposition of wafers (supply of process gas) and gas exhaust are repeated 350 to 500 times, the pressure control time can be shortened, resulting in a reduced manufacturing time of a semiconductor. This system is effective in reducing a production cost.

(Third Embodiment)

Figure 10:
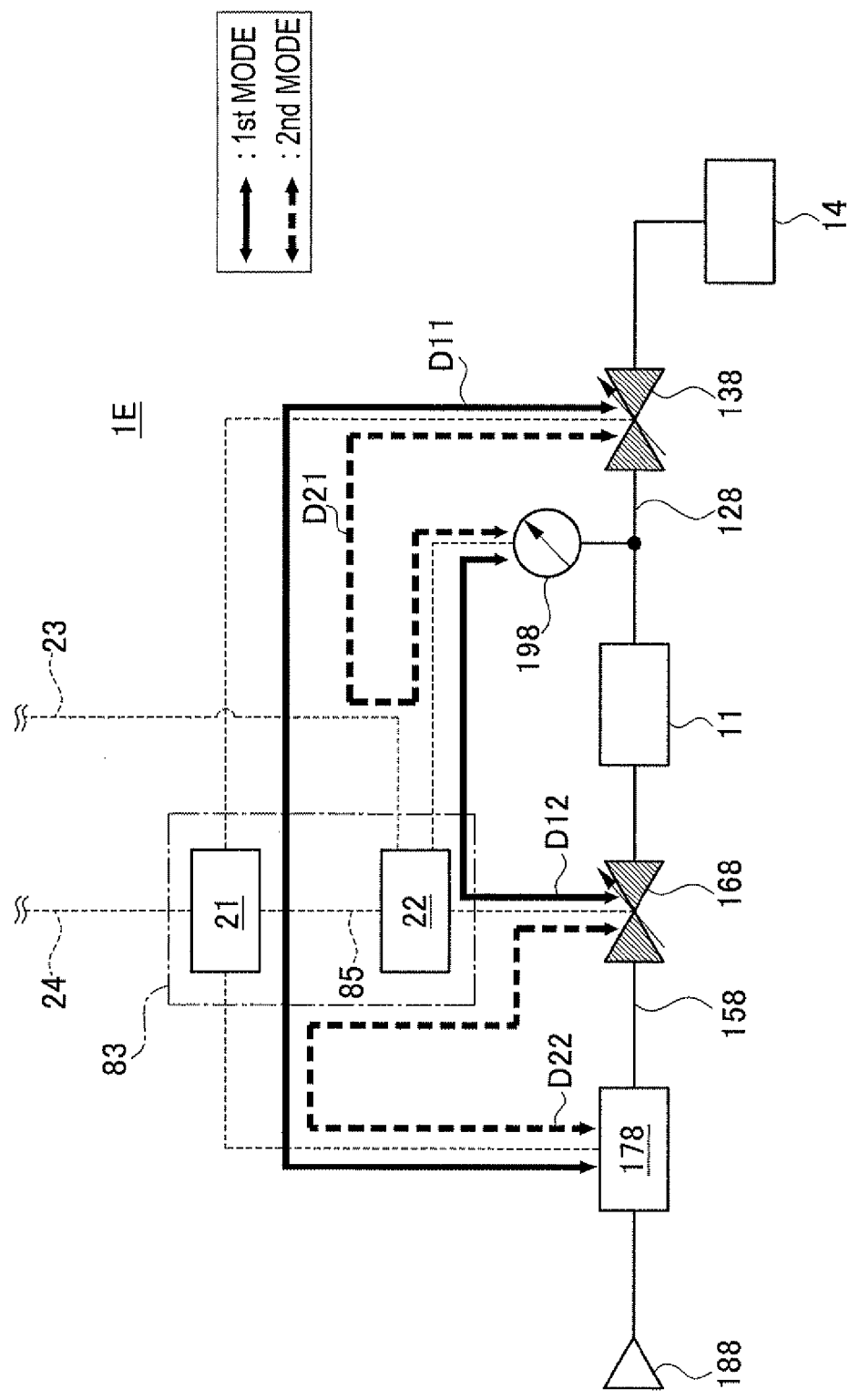
FIG. 10 is a diagram showing an entire configuration of a fluid control system of a third embodiment of the invention.

FIG. 10 shows an entire configuration of a vacuum control system 1E of a third embodiment of the invention. In FIG. 10, a flowmeter 178 and a proportional valve 168 are arranged on a gas supply pipe 158 communicating to a gas supply source 188.

On an exhaust pipe 128 communicating to the vacuum pump 14, a pressure sensor 198 and a metering valve 138 are arranged.

The flow controller 21 and the pressure controller 22 are connected to each other through a command line 85 to provide control link therebetween. The flow controller 21 and the pressure controller 22 constitute a combined controller 83. Since the flow controller 21 and the pressure controller 22 are connected to each other through the command line 85, a first mode and a second mode shown in FIG. 10 can be switched from one to the other.

In FIG. 10, the same reference signs as those in FIG. 1 denote similar or identical parts to those in the first embodiment. The details thereof are thus omitted herein.

The vacuum control system 1E shown in FIG. 10 is identical in configuration to the vacuum control system 1 shown in FIG. 1 excepting that the system 1E includes the combined controller 83 consisting of the flow controller 21 and the pressure controller 22 connected through the command line 85. Therefore, if connection of the command line 85 is removed, the vacuum control system 1E is completely identical to the vacuum control system 1.

<First Mode>

In FIG. 10, solid lines D11 and D12 indicate a control line of the first mode. In the first mode, the connection of the command line 85 is disabled. In the first mode, as indicated by the solid line D11, the flow controller 21 controls the metering valve 138 based on a measured value (an output value) of the flowmeter 178 as in the vacuum control system 1. Furthermore, as indicated by the solid line D12, the pressure controller 22 controls the proportional valve 168 based on a measured value (an output value) of the pressure sensor 198. The above control method is similar to the control method conducted in the vacuum control system 1 of the first embodiment and thus can provide the same operations and effects as those in the vacuum control system 1 of the first embodiment shown in FIGS. 2 and 4. The system for the same pressure control and flow-rate control as in FIGS. 2 and 4 is referred to as the first mode in the third embodiment.

<Second Mode>

Furthermore, the vacuum control system 1E includes, differently from the vacuum control system 1 shown in FIG. 1, the combined controller 83 consisting of the flow controller 21 and the pressure controller 22 which are connected by the command line 85. This system 1E is able to perform the second mode control, differently from the vacuum control system 1 shown in FIG. 1.

The broken lines D21 and D22 indicate a control line of the second mode. In the second mode, as indicated by the broken line D22, the flow controller 21 controls the proportional valve 168 based on a measured value (an output value) of the flowmeter 178 to regulate the flow rate of process gas allowed to flow in the vacuum chamber 11. Further, as indicated by the broken line D21, the pressure controller 22 controls the metering valve 138 based on a measured value (an output value) of the pressure sensor 198 to adjust the internal pressure of the vacuum chamber 11. While the flow controller 21 and the pressure controller 22 are connected by the command line 85, they are regarded as a single combined controller 83, which is able to conduct the aforementioned controls.

In FIG. 11(a)-(d) showing the status of the vacuum control system 1E in FIG. 10, a solid line P3 indicates the internal pressure of the vacuum chamber 11, a solid line M3 indicates the flow rate of process gas passing through the flowmeter 178, a solid line H3 indicates the opening degree of the proportional valve 168, and a solid line V3 indicates the opening degree of the metering valve 138. In the case of controlling the internal pressure of the vacuum chamber 11 from the vacuum state value R to the pressure set value Q, as shown in FIG. 11, in the stage TB2, the pressure controller 22 brings the metering valve 138 into a valve closed state based on a measured value (an output value) of the pressure sensor 198 as indicated by the solid line V3 in FIG. 11(d). On the other hand, the flow controller 21 brings the proportional valve 168 into a valve open state based on a measured value (an output value) of the flowmeter 178 as indicated by the solid line H3 in FIG. 11(c), thereby allowing a constant rate of process gas to flow in the vacuum chamber 11. As the constant rate of process gas flows in the vacuum chamber 11, the internal pressure of the vacuum chamber 11 rises as shown by the solid line P3 in FIG. 11(a).

Subsequently, the pressure sensor 198 shown in FIG. 10 detects that the internal pressure of the vacuum chamber 11 reaches the pressure set value Q. At the same time when the pressure set value Q is reached, the pressure controller 22 opens the metering valve 138 based on a measured value (an output value) of the pressure sensor 198 as indicated by the solid line V3 of FIG. 11(d). Accordingly, the internal pressure of the vacuum chamber 11 can be held stable at the pressure set value Q.

Figure 11:
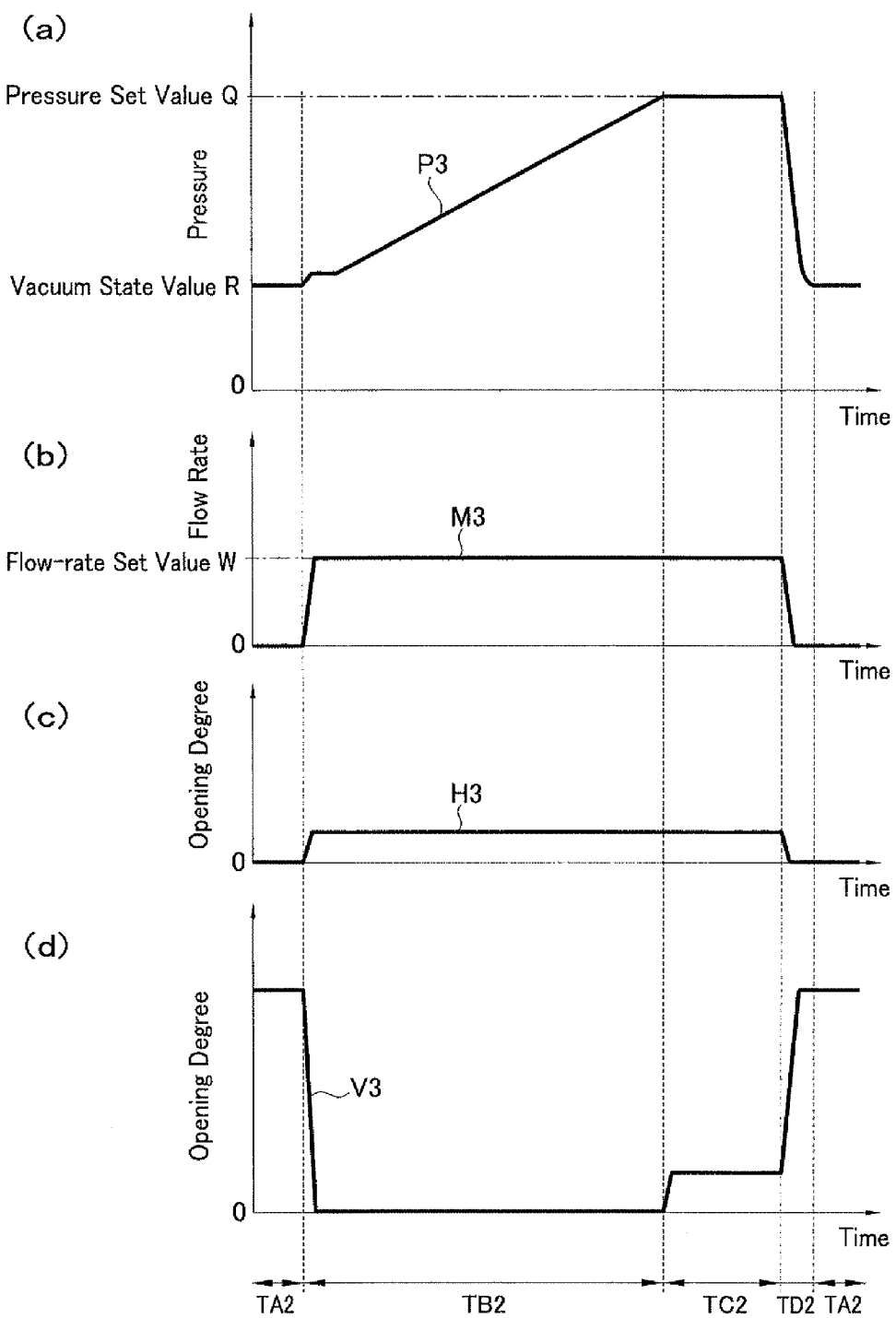
FIG. 11 is a time chart showing operations for pressure control and flow-rate control of the fluid control system of the third embodiment.

In the vacuum control system 1E, the flow controller 21 controls the proportional valve 168 based on a measured value (an output value) of the flowmeter 178, thereby regulating the flow rate of process gas allowed to flow in the vacuum chamber 11, while the pressure controller 22 controls the metering valve 138 based on a measured value (an output value) of the pressure sensor 198 to adjust the internal pressure of the vacuum chamber 11. The system for pressure control and flow-rate control in the vacuum control system 1E shown in FIG. 11 is referred to as the second mode in the third embodiment.

In the vacuum control system 1E, either one of the first mode and the second mode is freely selected based on whether the command line 85 is used or not. This selection may be conducted for example by use of a program stored in the vacuum control system 1E or a switch or the like provided in the vacuum control system 1E. Since the first mode and the second mode are freely selectable, the ALD process can be performed in the same manner as in the related art. Thus, the vacuum control system 1E can be directly installed in any manufacturing line currently employing the conventional fluid control system. This enhances the convenience for a user who currently employs the second mode as in the related art but intends to use the first mode in the future.

Figure 12:
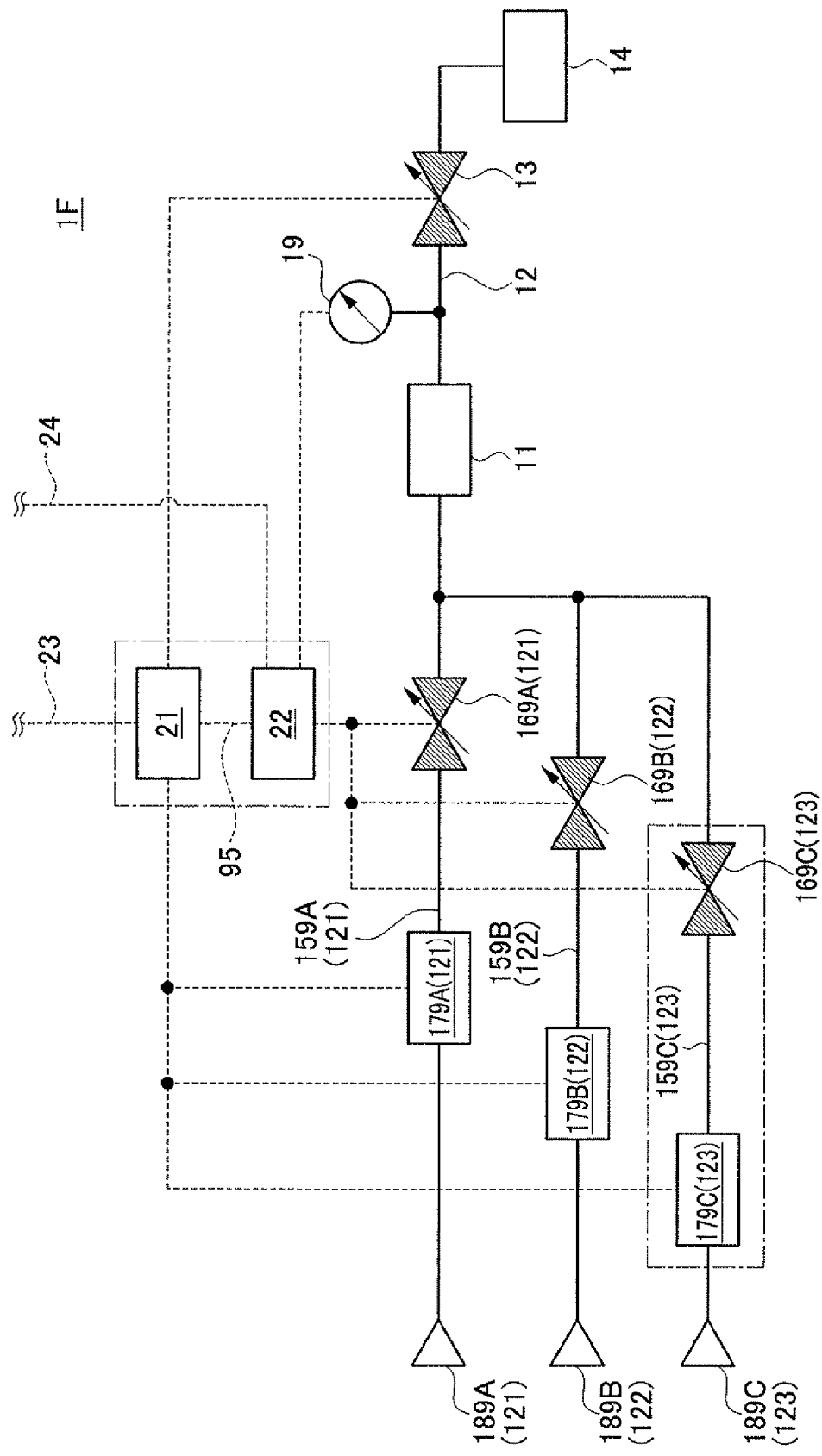
FIG. 12 is a diagram showing an entire configuration of a modified example of the fluid control system of the third embodiment.

FIG. 12 shows a modified example of the third embodiment, in which a vacuum control system 1F includes a plurality of gas supply units 121, 122, and 123. In these units 121-123, which are identical in configuration to that in the third embodiment, flowmeters 179A, 179B, and 179C and proportional valves 169A, 169B, and 169C are arranged respectively on gas supply pipes 159A, 159B, and 159C communicated to gas supply sources 189A, 189B, and 189C respectively. The flow controller 21 and the pressure controller 22 are connected to each other through a command line 95. Accordingly, this vacuum control system 1F is able to supply a plurality of gases in a similar manner to that in the second embodiment. Furthermore, the gas supply units 121, 122, and 123 can provide the same operations and effects as those in the third embodiment.

The present invention is not limited to the above embodiments and may be embodied in other specific forms without departing from the essential characteristics thereof.

For instance, the vacuum control systems of the above embodiments are used in the ALD process, but they may be used in a CVD process or other methods.

Figure 5:
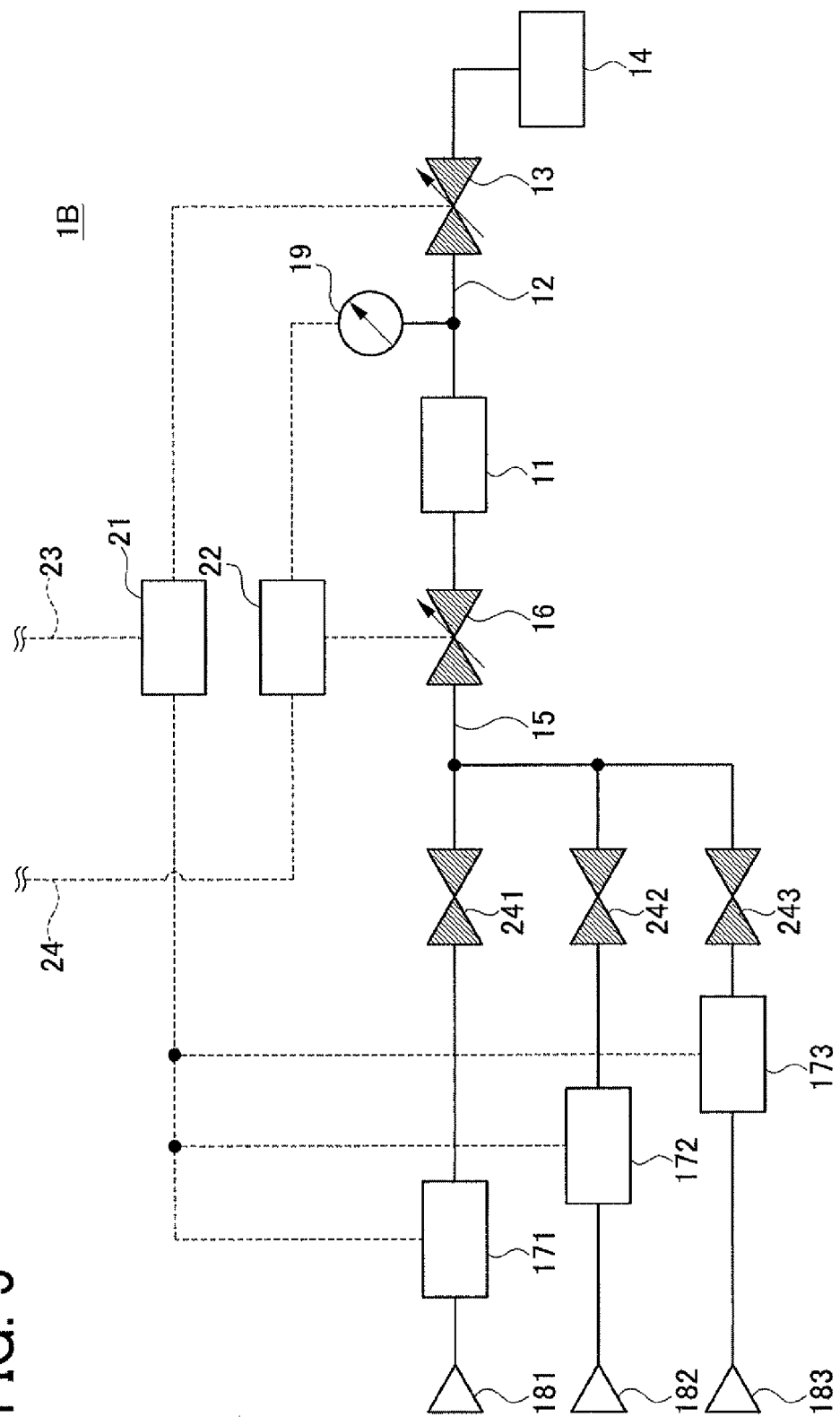
FIG. 5 is a diagram showing an entire configuration of modified example 1 of the fluid control system of the first embodiment.

For example, as shown in a vacuum control system 1B shown in FIG. 5, a plurality of flowmeters 171, 172, and 173 and a plurality of shut-off valves 241, 242, and 243 may be arranged. Specifically, the flowmeter 171 is placed between a process gas supply source 181 and the shut-off valve 241. The flowmeter 172 is placed between a process gas supply source 182 and the shut-off valve 242. The flowmeter 173 is placed between a process gas supply source 183 and the shut-off valve 243. The flowmeters 171, 172, and 173 are connected to the flow controller 21. The proportional valve 16 and the parts provided downstream thereof in the vacuum control system 1B shown in FIG. 5 are identical to those in the vacuum control system 1 shown in FIG. 1. In the vacuum control system 1B, the plurality of process gas supply sources can be controlled by use of a plurality of types of flowmeters. This enables a plurality of gases to be supplied to the vacuum chamber 11.

Figure 6:
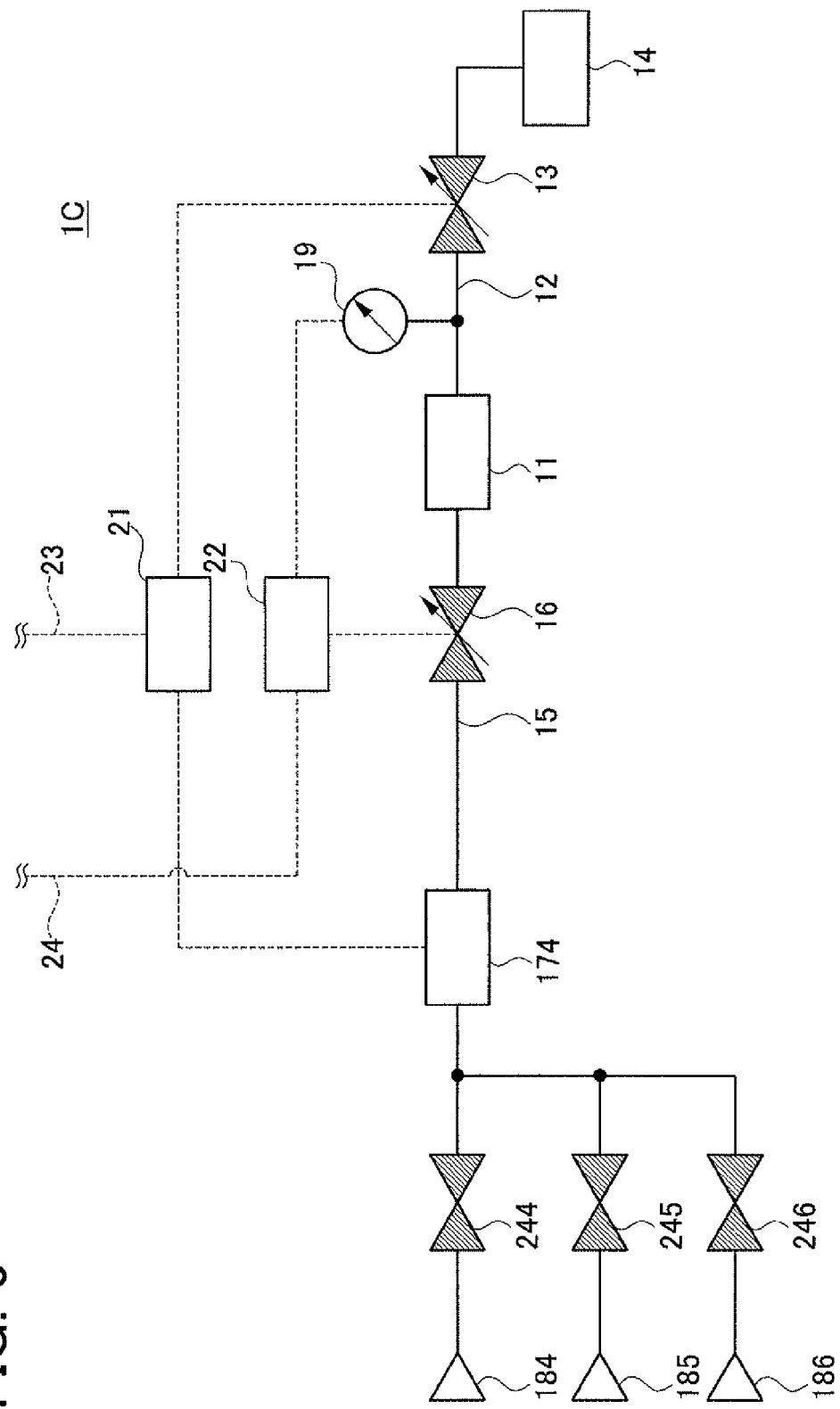
FIG. 6 is a diagram showing an entire configuration of modified example 2 of the fluid control system of the first embodiment.

For instance, as in a vacuum control system 1C shown in FIG. 6, process gas supply sources 184, 185, and 186 are communicated to a flowmeter 174. A shut-off valve 244 is placed between the process gas supply source 184 and the flowmeter 174, a shut-off valve 245 is placed between the process gas supply source 185 and the flowmeter 174, and a shut-off valve 246 is placed between the process gas supply source 186 and the flowmeter 174. The flowmeter 174 is of a type capable of measuring a plurality of kinds of process gases. The flowmeter 174 and the parts provided downstream thereof in the vacuum control system 1C shown in FIG. 6 are identical to those in the vacuum control system 1 shown in FIG. 1. In the vacuum control system 1C, the plurality of process gasses supplied from the gas supply sources are controlled by the single flowmeter 174 and the metering valve 13. Since the plurality of process gases are allowed to be supplied to the vacuum chamber 11 by using the single flowmeter, the number of flowmeters can be reduced, so that a low-cost vacuum control system can be provided.

For instance, the pressure set value based on the solid line P1 in FIG. 2(a) or the solid line P11 in FIG. 4(a) may be determined on a previously defined pressure curve or pressure linear pattern. Accordingly, the internal pressure of the vacuum chamber is controlled to a desired pressure state in an arbitrary time. An amount of gas to be supplied to the vacuum chamber can also be freely controlled. This makes it possible to restrain turbulence of a fluid due to gas supply to the vacuum chamber and prevent particles from being raised. Thus, the pressure control time can be reduced.

The pressure set value and the flow-rate set value may be set as a curve line value, a straight line value with constant gradient or stepwise value as well as the constant value.

The pressure set value and the flow-rate set value may also be set every time in response to a command from a high-order controller or may be stored and set in advance.

In the above embodiments, the control for adjusting the vacuum state value R to the vacuum pressure set value Q is performed. This pressure set value Q may also be a pressure exceeding atmospheric pressure. Furthermore, the vacuum pump 14 in the embodiments may be replaced with an opening to the atmosphere. In this case, the vacuum state value R in the embodiments can be changed to an atmospheric pressure state value. In other words, the pressure and the flow rate can be controlled in a pressure range from vacuum to higher than atmospheric pressure based on a differential pressure of the vacuum control system between the gas supply pipe 15 side and the exhaust pipe 12 side.

Although the above embodiments explain the fluid control system in the form of the vacuum control system, the invention is applicable to any other systems than the vacuum control system if only they are designed to control a fluid.

REFERENCE SIGNS LIST

1 Vacuum control system
11 Vacuum chamber
12 Exhaust pipe
13 Metering valve
14 Vacuum pump
15 Gas supply pipe
16 Proportional valve
17 Flowmeter
18 Process gas supply source
19 Pressure sensor
21 Flow-rate controller
22 Pressure controller

The invention claimed is:

1. A fluid control system comprising:
    a gas supply source to supply gas which is a fluid to a vacuum chamber;
    an exhaust pipe to discharge the fluid from the vacuum chamber;
    a gas supply pipe to connect the vacuum chamber and the gas supply source;
    a pressure sensor to detect an internal pressure of the vacuum chamber;
    a flowmeter placed on the gas supply pipe between the gas supply source and the vacuum chamber;
    a proportional valve placed on the gas supply pipe between the flowmeter and the vacuum chamber;
    a pressure controller to control the proportional valve in response to an output of the pressure sensor;
    a metering valve placed on the exhaust pipe; and
    a flow controller to control the metering valve in response to an output of the flowmeter.

2. The fluid control system according to claim 1, wherein
    a flow-rate set value is set in the flow controller,
    the flow controller controls the metering valve so that a flow rate of gas flowing in the gas supply pipe coincides with the flow-rate set value,
    a pressure set value is set in the pressure controller, and
    the pressure controller controls the proportional valve so that the internal pressure of the vacuum chamber coincides with the pressure set value.

3. The fluid control system according to claim 1, wherein the system includes:
    a first mode in which the flow controller controls the metering valve and the pressure controller controls the proportional valve, and
    a second mode in which the flow controller controls the proportional valve and the pressure controller controls the metering valve,
    the first mode and the second mode being selectable.

4. The fluid control system according to claim 2, wherein the system includes:
    a first mode in which the flow controller controls the metering valve and the pressure controller controls the proportional valve, and
    a second mode in which the flow controller controls the proportional valve and the pressure controller controls the metering valve,
    the first mode and the second mode being selectable.

5. The fluid control system according to claim 1, wherein a plurality of sets of gas supply units are provided, each set including the gas supply source, the flowmeter, and the proportional valve, the flowmeter and the proportional valve being placed on the gas supply pipe corresponding to the gas supply source,
    the sets of gas supply units are arranged in parallel with respect to the vacuum chamber.

6. The fluid control system according to claim 2, wherein a plurality of sets of gas supply units are provided, each set including the gas supply source, the flowmeter, and the proportional valve, the flowmeter and the proportional valve being placed on the gas supply pipe corresponding to the gas supply source,
    the sets of gas supply units are arranged in parallel with respect to the vacuum chamber.

7. The fluid control system according to claim 2, wherein control of the metering valve and control of the proportional valve are sequentially performed.

8. The fluid control system according to claim 2, wherein the pressure set value is determined based on a pressure curve or a pressure linear pattern.

9. A fluid control method of controlling a fluid control system comprising:
    a gas supply source to supply gas which is a fluid to a vacuum chamber;
    an exhaust pipe to discharge the fluid from the vacuum chamber;
    a gas supply pipe to connect the vacuum chamber and the gas supply source;
    a pressure sensor to detect an internal pressure of the vacuum chamber;
    a flowmeter placed between the gas supply source and the vacuum chamber;
    a proportional valve placed between the flowmeter and the vacuum chamber;
    a pressure controller to control the proportional valve in response to an output of the pressure sensor;
    a metering valve placed on the exhaust pipe; and
    a flow controller to control the metering valve in response to an output of the flowmeter,
    wherein the metering valve is controlled to regulate a flow rate of the gas to a flow-rate set value.

* * * * *